United States Patent [19]
Herget et al.

[11] Patent Number: 5,463,907
[45] Date of Patent: Nov. 7, 1995

[54] VIBRATING WIRE RANGE EXTENDER

[76] Inventors: Gerhard H. Herget, 85 Country Lane, Kanata, Ontario, Canada, K2L 1J4; Ken J. Judge, R.R. #3, Kemptville, Ontario, Canada, K0G 1J0

[21] Appl. No.: 233,785

[22] Filed: Apr. 26, 1994

[51] Int. Cl.$^6$ .................................................. G01L 5/00
[52] U.S. Cl. .................................. 73/862.392; 73/784
[58] Field of Search .............................. 73/704, 778, 779, 73/862.41, 862.381, 862.392, 862.56, 862.382, 784

[56] References Cited

U.S. PATENT DOCUMENTS

| | | | |
|---|---|---|---|
| 3,052,116 | 9/1962 | Critchley et al. | 73/778 |
| 3,380,167 | 4/1968 | Abel, Jr. et al. | 73/784 |
| 4,070,906 | 1/1978 | Rupert et al. | 73/784 |
| 4,074,565 | 2/1978 | Harris et al. | 73/778 |
| 4,277,973 | 7/1981 | Hawkes . | |
| 4,329,775 | 5/1982 | Olsen et al. | 73/704 |
| 4,663,975 | 5/1987 | Parkinson . | |
| 5,003,825 | 4/1991 | Lew | 73/704 |
| 5,038,622 | 8/1991 | Tijmann . | |

*Primary Examiner*—Richard Chilcot
*Assistant Examiner*—Ronald Biegel

[57] ABSTRACT

The invention relates to the field of measuring instruments and, in particular to sensing apparatus capable of measuring displacement or deformation for the ultimate purpose of monitoring strain and/or stress. The vibrating wire measuring principle provides a very reliable method of measuring small deformations with high precision. Measurement apparatus utilizing this principle, however, tend to be limited in range to the elastic limit of the stretched wire. To increase the useful range of measurement of a vibrating wire monitor, a spring may be placed in series with the wire. In order to prevent the spring from vibrating during the resonancing of the wire and thereby delaying the determination of the wire's resonant frequency, the invention contemplates isolation of the spring from the wire in a vibrational sense. In one form of the invention, isolation is achieved by causing a nodal point to be formed on the spring side of the wire. The nodal point may be formed by pressing a fret against the wire.

29 Claims, 3 Drawing Sheets

VIBRATING WIRE RANGE EXTENDER

FIELD OF THE INVENTION

The present invention relates to vibrating wire displacement transducers and, in particular, to vibrating wire strain monitors capable of measuring displacements over an extended range.

BACKGROUND

Displacement sensors capable of measuring over a large range (3–13cm) available at present are typically of the mechanical and/or electrical, i.e. variable resistance or induction types. Devices of this type are usually less accurate and variable resistance or induction type devices tend to lack long term stability.

The vibrating wire measuring principle provides a very reliable method of measuring small deformations with high precision. Unidirectional vibrating wire strain monitors, in general, comprise a thin wire anchored at its ends to produce a nominal tension therein. The ends are movable relative to one another, for example in response to deformation, so as to produce a change in the tension of the wire. Autoresonance or plucking circuits are typically used to force electromagnetically the wire to vibrate and to determine subsequently the resultant resonant frequency of the wire. Since the resonant frequency of vibration is dependent, among other things, on the tension in the wire, a change in distance between the ends of the wire will result in a corresponding change in the resonant frequency of the wire. Unfortunately, the range of measurement of such vibrating wire strain monitors is limited because the deformations must remain within the elastic range of stretch of the wire.

In U.S. Pat. No. 5,038,622, issued Aug. 31, 1991, a calibrated extension spring is secured to the end of the vibrating wire to achieve an increase in range. It has been found, however, that difficulties are encountered in obtaining a resonant frequency for the wire if an extension spring is used that possesses relatively low stiffness, with respect to the wire, in the lateral and longitudinal direction with the vibrating wire only lightly stressed.

SUMMARY OF THE INVENTION

In order to overcome the aforementioned disadvantages, the present invention contemplates substantially isolating the spring from vibrating with the wire while taking full advantage of the extended range potential offered by wire and spring combinations. First considered was the use of a compression spring in series with the wire and including means for transposing the spring force to maintain the tension on the wire. More specifically, the wire is fixedly clamped at one end within a housing while at the other end it is clamped within a movable body. The body is situated within a telescoping plug which is movable relative to the housing and which is biased away from the body by means of the compression spring. Both the telescoping plug and the opposite end of the housing are anchorable to the points of interest, for example the walls of a borehole, so that compressive and tensile deformations may be monitored.

If the spring is relatively stiff and the body containing the wire clamp on the spring side is relatively massive, the wire will vibrate as if mounted between two fixed points with the resonant frequency thereof being readily determinable. In order to allow for relatively large deformations to be monitored, a relatively weak spring must be used. However, in this case, the detection of the resonant frequency is at times delayed because the spring side of the clamp participates in the vibration. To avoid this, a fret is placed against the wire on the spring side to create a nodal point. With the fret, the wire length for resonance is the distance between the fixed clamping point and the fret. It has been found advantageous to utilize a fret even when the compression spring is relatively stiff and the body is relatively massive because the resonant frequency of the vibrating wire is ascertained more quickly, especially when the tension in the wire is rather low, and it allows for rather crude couplings between the wire and the spring.

Furthermore, it has been found that the fret's advantages apply equally as well if the vibrating wire strain monitor employs an extension spring to increase its useful range, even in the case of so-called soft extension springs. Additionally, if the fret is adjustable in relation to the wire, this provides a convenient means for optimizing the distance of the wire from the exciter/pickup during instrument assembly.

It is, therefore, an object of this invention to provide a vibrating wire strain monitor which is capable of measuring displacements over an extended range. It is another object of this invention to provide an extended range vibrating wire strain monitor which utilizes a spring in conjunction with the wire to increase its useful range yet which isolates the spring from participating in the resonancing of the wire. It is yet another object of this invention to provide an arrangement which effectively creates a nodal point on the spring side of the wire in order to isolate the spring in a vibrational sense. It is a further object of this invention to enable a compression spring to be employed in series with the wire by providing means for transposing the spring force to maintain the tension on the wire. It is another object of the invention to utilize a fret to enable resonance of a vibrating wire and spring combination type strain monitors to be readily achieved. It is still another object of the invention to utilize a fret to facilitate optimum adjustment of the vibrating wire with respect to the exciter/pickup.

These and other objects and advantages will become apparent from the description detailed hereinbelow with reference made to the attached drawings wherein:

DETAILED DESCRIPTION OF THE PREFERRED EMBODIMENT

Figure 1:
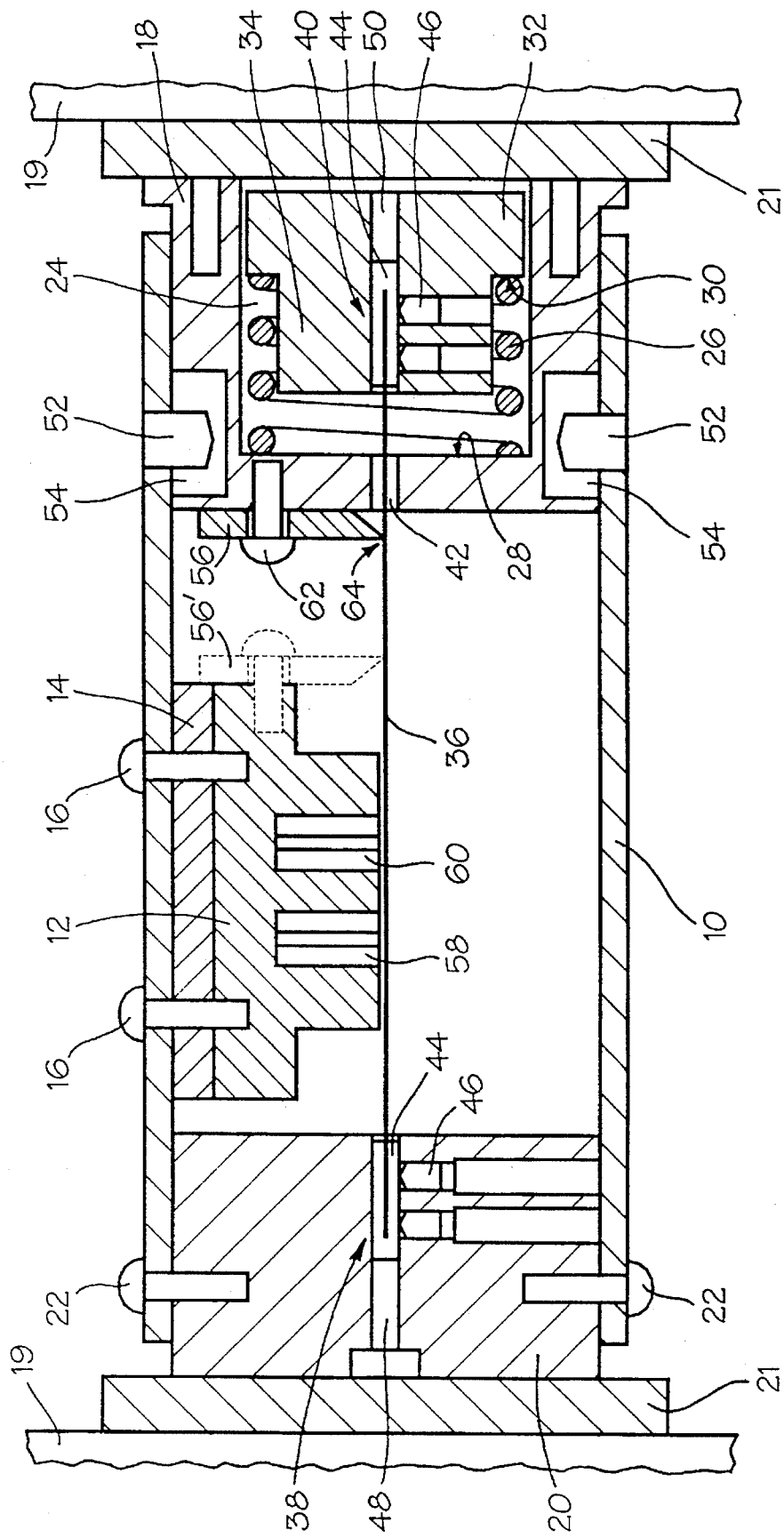
FIG. 1 is a partial cross-sectional view of the invention which utilizes a compression spring in conjunction with the wire.

Referring now to FIG. 1, an embodiment of the invention is shown having an elongate housing 10 in which there is mounted an electromagnetic exciter/pickup unit 12. The exciter/pickup unit 12 has a spacer 14 and both are fastened to the housing 10 such as with screws 16. An anchorable telescoping block or plug 18 is disposed for sliding movement within one end of the housing 10 while an anchorable end block 20 is affixed at the opposite end by suitable means such as by screws 22. The telescoping plug 18 has a cavity 24 therein adapted to receive a compression spring 26 which, at one end thereof, abuts against the terminal wall 28 of the cavity 24. The opposite end of the spring 26 abuts against shoulder 30 of the clamp body 32, a portion 34 of which extends centrally into the spring 26. Within the housing 10, a high strength wire 36 is secured at one end within a fixed clamp 38 in the end block 20 and at its other end within clamp 40 in the clamp body 32, passing through an aperture 42 in the terminal wall 28 of the telescoping plug 18. The clamping within clamps 38,40 can be achieved in any conventional manner but as illustrated the ends of the wire 36 are held within retaining sleeves 44 which are secured by set screws 46 within holes 48,50 in the end block 20 and the clamp body 32, respectively.

The telescoping plug 18 and the end block 20 are each adapted to be anchored to the points of interest 19 by suitable anchoring means, the methodology of which is well developed in the field of this invention. Typically, this can be achieved by affixing plates 21 to the points of interest 19 and anchoring the end block 20 and the telescoping plug 18 to a respective one of the plates 21. It is also possible to mount the monitor between two other vibrating wire strain monitors having their direction of monitoring in mutually exclusive planes in the manner shown in the inventor's U.S. Pat. No. 5,113,707, issued May 12, 1992, and entitled "Three-Dimensional Strain Monitor for Rock Boreholes". Anchoring of the monitor establishes an equilibrium between the tension in the wire 36 and the compression in the spring 26 as is depicted in FIG. 1. In order that the tension in the wire 36 does not exceed its elastic limit and/or to maintain the tension of the wire within the calibration range of the instrument, suitable stops 52 are provided which serve to retain the telescoping plug 18 within the housing 10 and to limit the stroke of the plug 18 therein. In the embodiment shown in FIG. 1, the stops 52 comprise a set of pins affixed to the housing 10 which extend into corresponding longitudinal slots 54 provided in the telescoping plug 18.

The particular arrangement of the clamp body 32, compression spring 26 and telescoping plug 18 shown in FIG. 1 enables tension to be maintained on the wire 36. If the spring 26 is relatively stiff and the body 32 containing the wire clamp 40 on the spring side is relatively massive, the wire 36 will vibrate as if mounted between two fixed points with the resonant frequency thereof being readily ascertainable. However, for a given length, a stiffer spring will provide less of a range than will a weaker spring. Depending on the stiffness of the spring and/or the mass of the clamp body 32, it may be necessary to include a fret 56 to press against the wire between the exciter/pickup 12 and the spring 18. The fret 56 creates a nodal point and thereby isolates the spring 26 from participating in the wire vibration. With the arrangement shown in FIG. 1, the body 32 holding the clamp 40 for the vibrating wire 36 on the spring side is sufficiently massive to allow resonant vibrations to occur in the wire 36, without necessitating the use of the fret 56. However, there are advantages in using the fret 56 in this case in that it allows for a quicker determination of the resonant frequency of the wire 36. It also permits convenient adjustment and optimization of the distance between the coils 58,60 of the exciter/pickup unit 12 and the wire 36. This distance is important since the electromagnetic force of the coils diminishes with distance yet sufficient distance must be provided for the wire 36 to resonate with adequate amplitude. In the embodiment shown, the fret 56 is adjustable in that it can be moved transversely with respect the wire 36 and then tightened in position by means of screw 62.

Assembly of the instrument shown in FIG. 1 is generally as follows. First, the exciter/pickup unit 12, spacer plate 14, and the anchorable end block 20 are fastened to the housing 10. The fret 56 is then attached to the inward end of the telescoping plug 18 so that the angled tip 64 is on the axis of the aperture 42. The plug 18 is placed into the housing 10 and the stops 44 are put in place. Using conventional techniques such as described above, one end of the wire 36 is clamped within the clamp body 32. The compression spring 26 is then slid over the extension 34 and against shoulder 30 of the clamp body 32. The wire 36 is threaded through the aperture 42 in the plug 18 and is lightly clamped in the fixed clamp 38 of the end block 20. With the exciter 12 turned on, the wire 36 is tensioned until the wire 36 begins to oscillate and the lowest clean stable resonance is attained. The wire 36 is then clamped tightly in clamp 38. Some adjustment of the fret's lateral position may be necessary to allow free oscillation of the wire 36 over the exciter/pickup 12 or to position the wire 36 close enough to the exciter 12 to attain oscillation.

The monitor is then calibrated using known techniques to create a calibration chart of output signal (of the autoresonance circuit which is typically in Hz.) v. deformation or a derivative thereof. By calibrating the instrument as a whole, it is not necessary, therefore, to utilize a calibrated spring. On location, such as in a borehole in rock, the monitor is anchored as explained above and a zero reading is taken. Readings may then be taken periodically or continually with the readings from the unit being converted though the calibration chart into deformations and, based on the distance between the clamping points of the instrument, into strains. In the case of hard rock, elastic theory is used to back-calculate stress changes in the rock masses. The monitoring of the output of the device is such that it is readily automated by way of computer-aided or other electronic data acquisition systems.

FIG. 1 shows in phantom an alternate positioning of the fret 56' wherein the fret 56' is adjustably attachable to the exciter/pickup unit 12. In this case, the effective length of the wire 36 remains constant as the distance between the plug 18 and the end block 20 changes. The fret 56,56', as shown in FIG. 1, preferably comprises a prismatic bar with an angled tip 64 which contacts and presses down upon the wire 36 so as to create a nodal point. The angling of the tip 64 provides a low friction surface along which the fret 56 can slide relative to the wire 36, if necessary, as well as provides a precise nodal point on the spring side of the wire. With the arrangement shown in FIG. 1, the fret 56 will move along the wire 36 as the distance between the plug 18 and the end block 20 varies.

Figure 2:
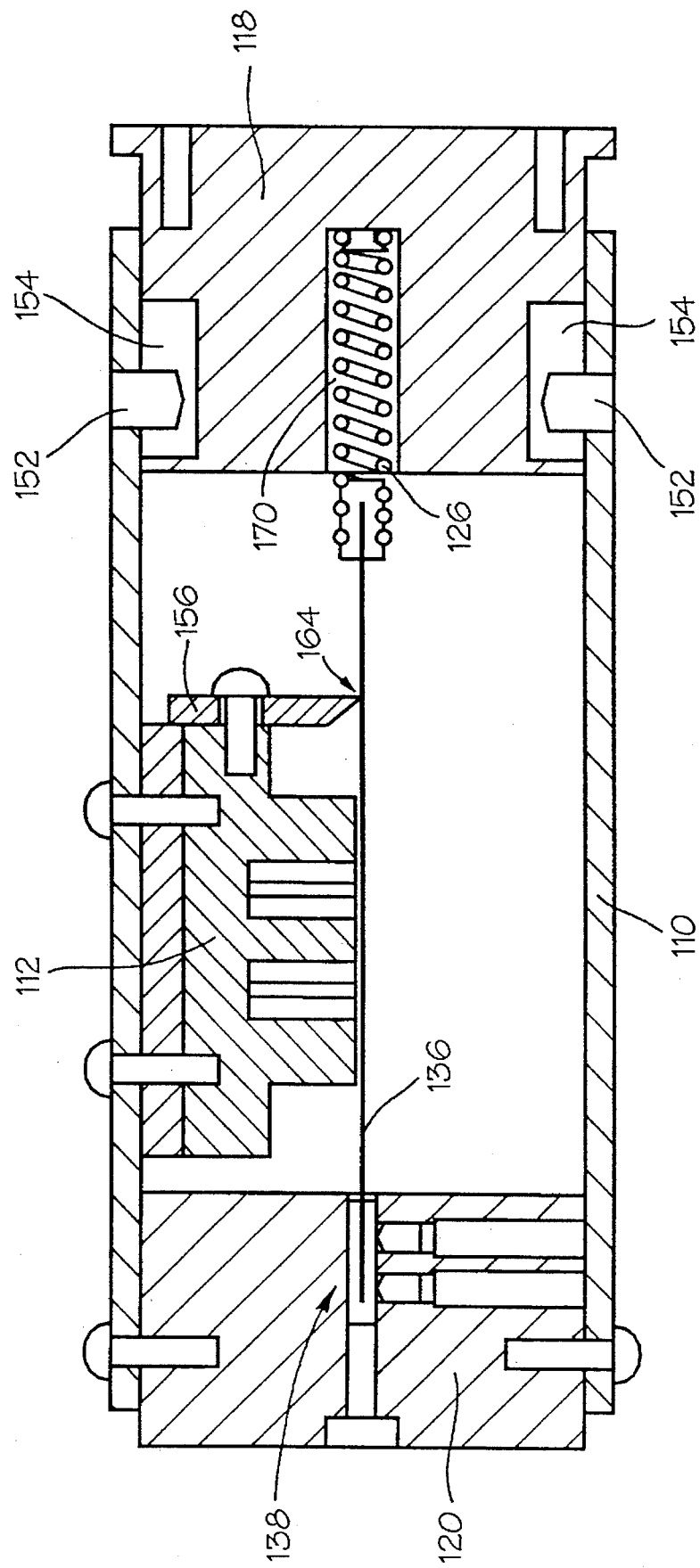
FIG. 2 is a partial cross-sectional view of the invention which utilizes an extension spring in conjunction with the wire.

The fret's advantages are also apparent when used in conjunction with an extension spring arrangement such as the one illustrated in FIG. 2. In this Figure, elements similar to those identified in FIG. 1 are referenced likewise but incremented by 100. The exciter/pickup unit 112 and anchorable end block 120 are attached to the housing 110 as in FIG. 1. An anchorable telescoping plug 118 is disposed for sliding movement at the end of the housing 110 opposite the end block 120. Stops 152 are provided which serve to retain the telescoping plug 118 within the housing 110 and to limit the stroke of the plug 118 therein. As in FIG. 1, the stops 152 comprise a set of pins affixed to the housing 110 which extend into corresponding longitudinal slots 154 provided in the telescoping plug 118.

The wire 136 is clamped at one end within the fixed clamp 138 in the end block 120. The other end of the wire 136 is secured to the one end of the extension spring 126 and the other end of the spring is connected to the telescoping plug 118. A transversely adjustable fret 156 positioned such that its angled tip 164 comes into contact with the wire 136, thereby creating a nodal point at the point of contact. A relative movement between the anchored end block 120 and the anchored telescoping plug 118 produces a change in the tension of the wire 136, which change will result in a corresponding change in the resonant frequency of the wire 136 when vibrated.

When using an extension spring in series with the wire, the spring and the connections between the wire and the spring and the spring and the movable plug should have an overall lateral stiffness which is sufficient to ensure the fret remains in contact with the wire during resonancing. If the spring that is to be used is relatively weak in the lateral direction and/or the wire to spring and spring to anchor point connections are not very rigid, then it may be desirable to confine the spring against excessive lateral movement. In the embodiment shown in FIG. 2, the spring is disposed within a cavity 170 of the telescoping plug 118. The cavity 170 is sized sufficiently small so as to prevent significant lateral movement of the spring during resonancing but large enough so as to permit longitudinal movement of the spring substantially without friction.

Figure 3:
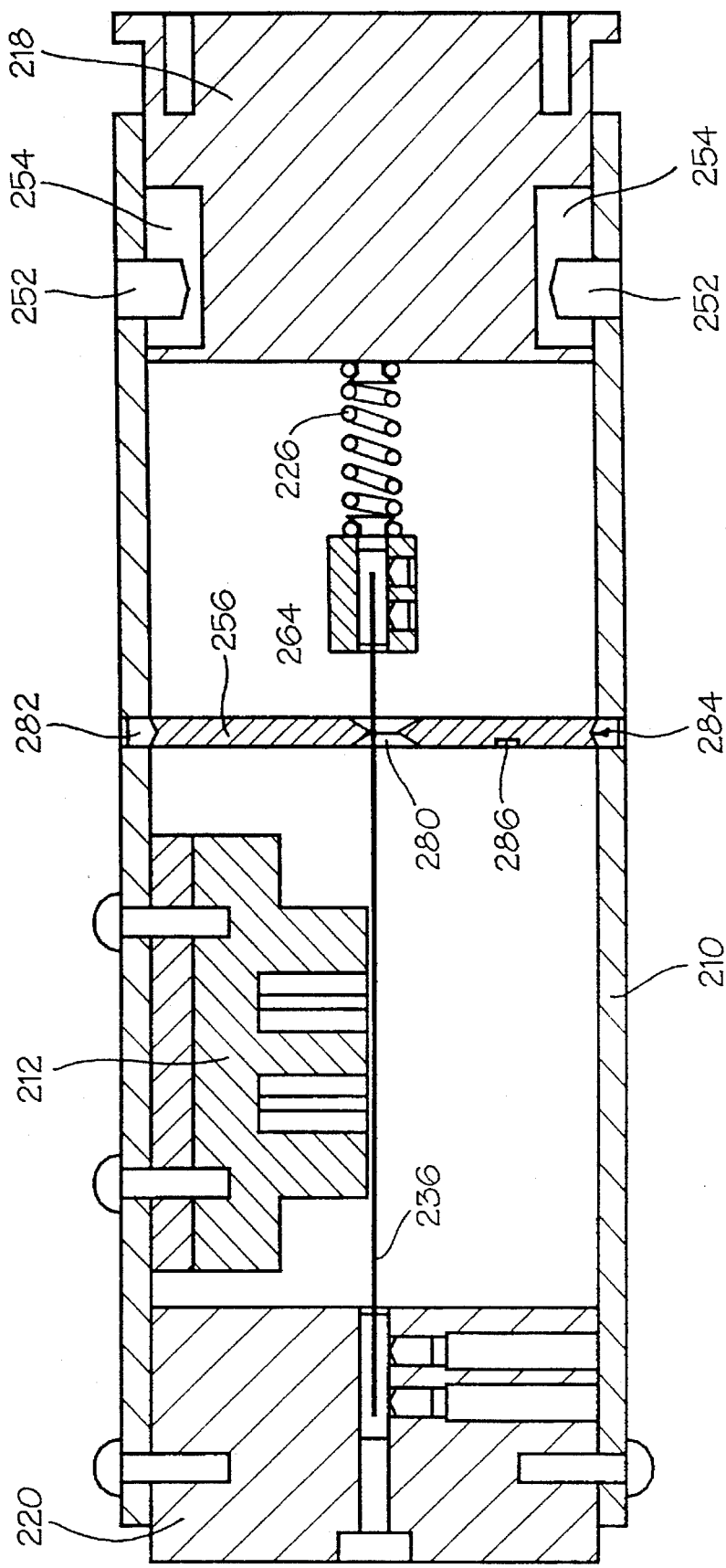
FIG. 3 is a side view of illustrating a variant of the extension spring and wire combination of FIG. 2 and employing an alternate fret arrangement.

The principles of the invention can also be seen in FIG. 3 wherein the spring is isolated from the wire in a vibrational sense in an alternate manner. As with FIG. 2, elements similar to those illustrated in FIG. 1 are likewise referenced except this time incremented by 200. The exciter/pickup unit 212 and anchorable end block 220 are attached to the housing 210 as in FIG. 1. An anchorable telescoping plug 218 is disposed for sliding movement at the end of the housing 210 opposite the end block 220. Stops 252 are provided which serve to retain the telescoping plug 218 within the housing 210 and to limit the stroke of the plug 218 therein. As in FIG. 1, the stops 252 comprise a set of pins affixed to the housing 210 which extend into corresponding longitudinal slots 254 provided in the telescoping plug 218. In this case, the nodal point is achieved by providing a fret in the form of a disc 256 having an off-centred aperture 280 through which wire 236 is positioned. The aperture 280 tapers inwardly at either end thus providing an annular edge 264 which is used to press against the wire 236 to create the nodal point. The disc 256 is positioned within housing 210 such as by set screws 282 which engage a groove 284 provided along the periphery of the disc 256. With the set screws 282 being in place but not completely tightened, rotation of the disc 256 by use of cutout 286 or similar means provides the ability to adjust the aperture 280 with respect to the wire 236 due to the eccentricity of the aperture 280.

While not shown, it will be understood by those skilled in the art that it is possible to achieve isolation of the spring from the wire in various ways such that the spring is effectively prevented from delaying the recognition of the resonant frequency of the wire while obtaining the extended range advantages in using the spring. For example, the nodal point could be achieved by providing between the wire and an extension spring a relatively massive clamp body which is slidable within the housing with a minimum of friction. The clamp body is thus prevented from lateral movement with respect to the wire during resonancing and, due to its mass, will be substantially prevented from forced axial vibration.

Although there has been shown and described herein embodiments of the extended range vibrating wire strain monitor according to the present invention, it will be understood that various modifications or substitutions may be made thereto without departing from the spirit and scope of the invention as defined in the appended claims.

I claim:

1. A vibrating wire strain monitor comprising:

a generally elongate housing having first and second ends;

first end block means fixed at said first end of said housing;

second end block means disposed at said second end of said housing, said second end block means being movable with respect to said first end block;

a wire having an elastic range of stretch, said wire connected longitudinally in series with a spring within the housing and between said first and second end block means to permit a range of displacement between said first and second end blocks greater than said elastic range of stretch of said wire, said end block means being anchorable between two points to be monitored whereby relative movement between said points results in a corresponding increase or decrease in the tension of said wire;

exciter means adjacent the wire for causing the wire to be vibrated;

means for detecting the frequency of vibration of the vibrating wire; and means for substantially isolating the vibration of the wire from the spring so as to prevent the spring from delaying the detecting of the resonant frequency of the wire.

2. A vibrating wire strain monitor as claimed in claim 1, wherein said isolating means comprises means to form on the wire a nodal point on the spring side of the exciter means.

3. A vibrating wire strain monitor as claimed in claim 2, wherein said means for forming a nodal point comprises a fret which presses against the wire.

4. A vibrating wire strain monitor as claimed in claim 3, wherein said fret is transversely adjustable with respect to the wire enabling the distance between the wire and the exciter and frequency detecting means to be controllable.

5. A vibrating wire strain monitor as claimed in claim 2, wherein said means for creating a nodal point is a disc positioned within said housing, said disc having an off-centred aperture through which said wire extends in contact with an edge of said aperture.

6. A vibrating wire strain monitor as claimed in claim 5, wherein said disc is adjustably rotatable for enabling the distance between the wire and the exciter and frequency detecting means to be controllable.

7. A vibrating wire strain monitor as claimed in claim 2, wherein said means for creating said nodal point is disposed on said second end block means.

8. A vibrating wire strain monitor as claimed in claim 2, wherein said means for creating said nodal point is fixed with respect to said housing.

9. A vibrating wire strain monitor as claimed in claim 2, wherein stop means are provided for limiting the axial movement of the second end block means within the housing.

10. A vibrating wire strain monitor as claimed in claim 2, wherein said spring is a compression spring and the respective end block means on the spring side includes means adapted to transpose the spring force direction such that it acts in tension on the wire.

11. A vibrating wire strain monitor as claimed in claim 9, wherein said spring side end block means comprises:

a plug telescopingly movable within the housing, said plug having a cavity therein, said cavity opening axially outwardly of the housing and adapted to receive said compression spring with one end of said spring abutting the bottom of the cavity, the plug having an aperture through the bottom of the cavity through which the wire extends; and a clamp body movable axially within said cavity and abutting the opposite end of the spring, said clamp body having means to retain the spring side end of the wire therein.

12. A vibrating wire strain monitor as claimed in claim 2, wherein said spring is an extension spring.

13. In a vibrating wire strain monitor comprising a vibratable wire connected to a spring in series to increase the useful monitoring range of the vibrating wire, exciter means to vibrate the wire, and detection means to detect the resulting resonant frequency of the wire;

the improvement comprising means for forming a nodal point on the spring side of said wire to substantially isolate the spring from the vibrating with the wire.

14. The vibrating wire strain monitor as claimed in claim 13, wherein said means for forming a nodal point comprises a fret which presses against the wire.

15. The vibrating wire strain monitor as claimed in claim 14, wherein said fret is transversely adjustable with respect to the wire enabling the distance between the wire and the exciter and detecting means to be controllable.

16. The vibrating wire strain monitor as claimed in claim 13, wherein said means for forming a nodal point is a disc having an off-centred aperture through which said wire extends in contact with an edge of said aperture.

17. A vibrating wire strain monitor as claimed in claim 16, wherein said disc is adjustably rotatable for enabling the distance between the wire and the exciter and detecting means to be controllable.

18. The vibrating wire strain monitor as claimed in claim 13, wherein said spring is a compression spring.

19. The vibrating wire strain monitor as claimed in claim 13, wherein said spring is an extension spring.

20. An extended range vibrating wire strain monitor comprising:

an elongated housing having first and second ends;

a first end block means fixed at said first end of said housing;

a second end block means disposed at said second end of said housing and being movable axially with respect to said housing, said first and second end blocks being anchorable to a pair of spaced-apart points to be monitored;

first and second clamp means disposed within said housing at or near its first and second ends, respectively, said first clamp means being fixed with respect to said housing and said second clamp means being movable with respect to said housing;

a vibratable wire clamped between said first and second clamp means;

a spring interposed between said second clamp means and said second end block means, said spring and said wire thereby acting in series between said first and second end block means, whereby relative movement between said points results in a corresponding increase or decrease in the tension of said wire;

exciter means adjacent the wire for causing the wire to be vibrated;

means for detecting the frequency of vibration of the vibrating wire; and means for forming a nodal point on the wire between said detecting means and said second clamp means.

21. The extended range vibrating wire strain monitor as claimed in claim 20, wherein said means for forming a nodal point comprises a fret which presses against the wire.

22. The extended range vibrating wire strain monitor as claimed in claim 21, wherein said fret is transversely adjustable with respect to the wire enabling the distance between the wire and the exciter and detecting means to be controllable.

23. A vibrating wire strain monitor as claimed in claim 20, wherein said means for creating a nodal point is a disc positioned within said housing, said disc having an off-centred aperture through which said wire extends in contact with an edge of said aperture.

24. A vibrating wire strain monitor as claimed in claim 23, wherein said disc is adjustably rotatable for enabling the distance between the wire and the exciter and frequency detecting means to be controllable.

25. A vibrating wire strain monitor as claimed in claim 20, wherein said means for creating said nodal point is disposed on said second end block means.

26. A vibrating wire strain monitor as claimed in claim 20, wherein said means for creating said nodal point is fixed with respect to said housing.

27. A vibrating wire strain monitor as claimed in claim 20, wherein stop means are provided for limiting the axial movement of the second end block means within the housing.

28. The vibrating wire strain monitor as claimed in claim 20, wherein said spring is a compression spring.

29. The vibrating wire strain monitor as claimed in claim 20, wherein said spring is an extension spring.

* * * * *

UNITED STATES PATENT AND TRADEMARK OFFICE
CERTIFICATE OF CORRECTION

PATENT NO. : 5,463,907
DATED : November 7, 1995
INVENTOR(S) : HERGET, Gerhard H. and JUDGE, Ken J.

It is certified that error appears in the above-indentified patent and that said Letters Patent is hereby corrected as shown below:

On title page, add the following: Item [73]

"Her Majesty, The Queen, in Right of Canada as Represented by the Minister of Energy, Mines and Resources."

Signed and Sealed this

Twenty-fifth Day of June, 1996

Attest:

BRUCE LEHMAN

Attesting Officer          Commissioner of Patents and Trademarks